United States Patent [19]
Costello et al.

[11] 4,148,076
[45] Apr. 3, 1979

[54] FACSIMILE MACHINE

[75] Inventors: Matthew J. Costello, Bethel; Thomas K. Saunders, New Milford; Albert M. DeLuca, New Fairfield, all of Conn.

[73] Assignee: Graphic Sciences, Inc., Danbury, Conn.

[21] Appl. No.: 871,910

[22] Filed: Jan. 24, 1978

Related U.S. Application Data

[63] Continuation-in-part of Ser. No. 792,541, May 2, 1977, abandoned.

[51] Int. Cl.² .......................... H04N 1/06; H04N 1/24
[52] U.S. Cl. .................................. 358/286; 358/294; 358/285
[58] Field of Search .................. 358/286, 285, 294

[56] References Cited

U.S. PATENT DOCUMENTS

| | | | |
|---|---|---|---|
| 3,502,814 | 3/1970 | Salaman | 358/286 |
| 3,795,766 | 3/1974 | Farlow | 358/286 |

Primary Examiner—Howard W. Britton
Attorney, Agent, or Firm—Kevin R. Peterson; Robert A. Green; Edward J. Feeney, Jr.

[57] ABSTRACT

A facsimile machine includes a cylinder for supporting a paper which is to receive a message or which carries a message to be transmitted by telephone lines to a remote location. The machine includes a read-write assembly which is mounted for movement back and forth across the paper-carrying cylinder. The read-write assembly includes a light assembly for directing light onto a printed document, a stylus for printing electrostatic charge on a blank sheet of paper, and a relatively simple mechanical apparatus for switching the machine from the read status to the write status.

10 Claims, 15 Drawing Figures

FACSIMILE MACHINE

CROSS REFERENCE TO RELATED APPLICATION

This application is a continuation-in-part of application Ser. No. 792,541, filed May 2, 1977, now abandoned.

BACKGROUND OF THE INVENTION

Present day facsimile machines have reached a high state of sophistication and can perform a large number of functions automatically. However, in order to provide automatic operation, these machines require relatively complex and expensive mechanical and electronic features.

The present invention provides a facsimile machine which is lacking in automatic features; however, it has the desirable characteristics that it is relatively simple in construction and operation and it is relatively inexpensive.

DESCRIPTION OF THE PREFERRED EMBODIMENTS

Figure 1:
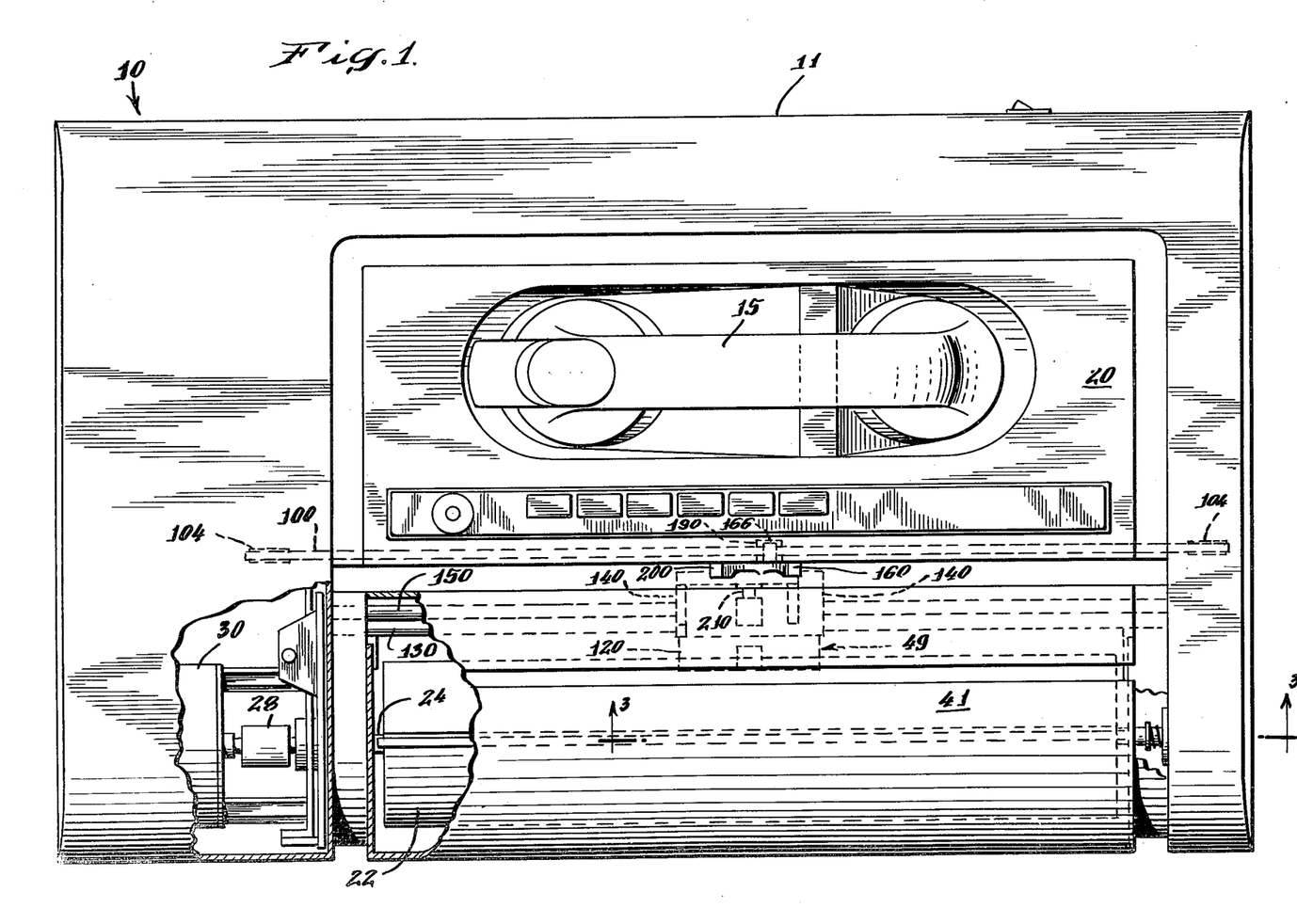
FIG. 1 is a plan view, partly in section, of a facsimile machine embodying the invention.
Figure 2:
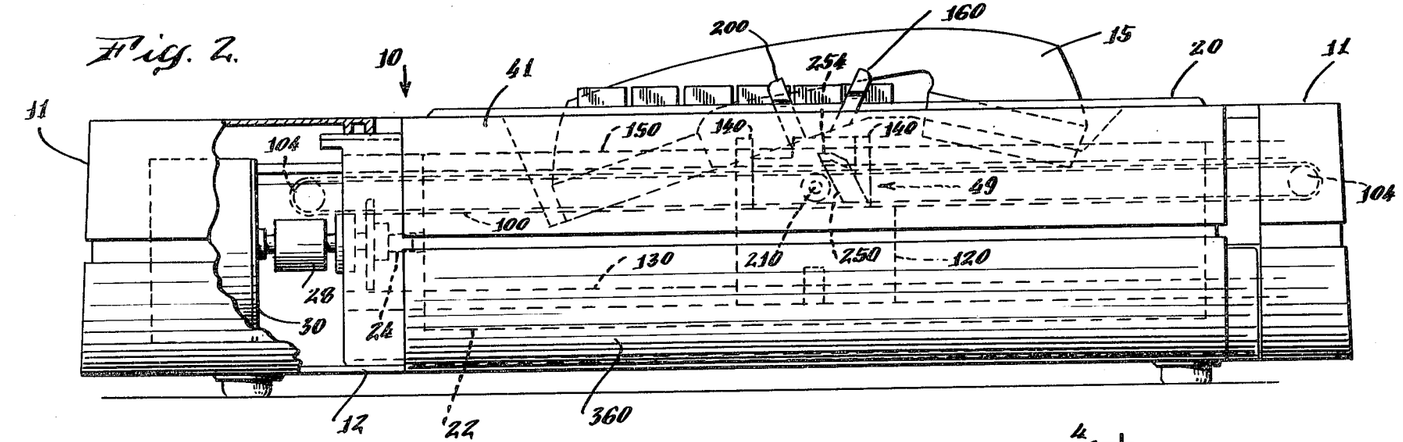
FIG. 2 is a front elevational view, partly in section, of the machine of FIG. 1.
Figure 3:
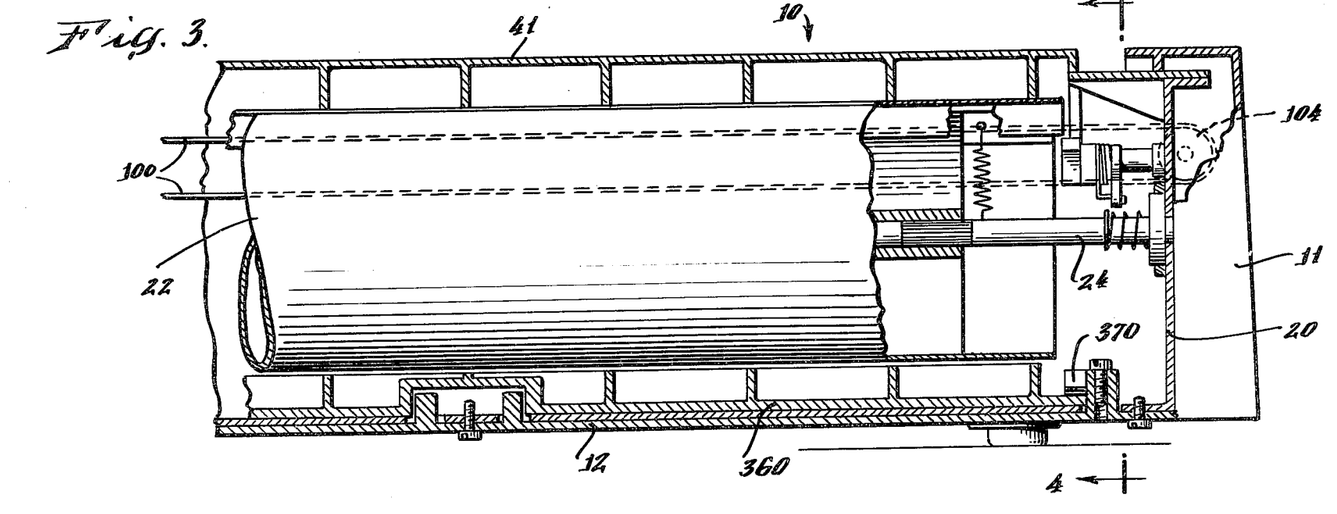
FIG. 3 is a sectional view of a portion of the line 3—3 in FIG. 1.
Figure 4:
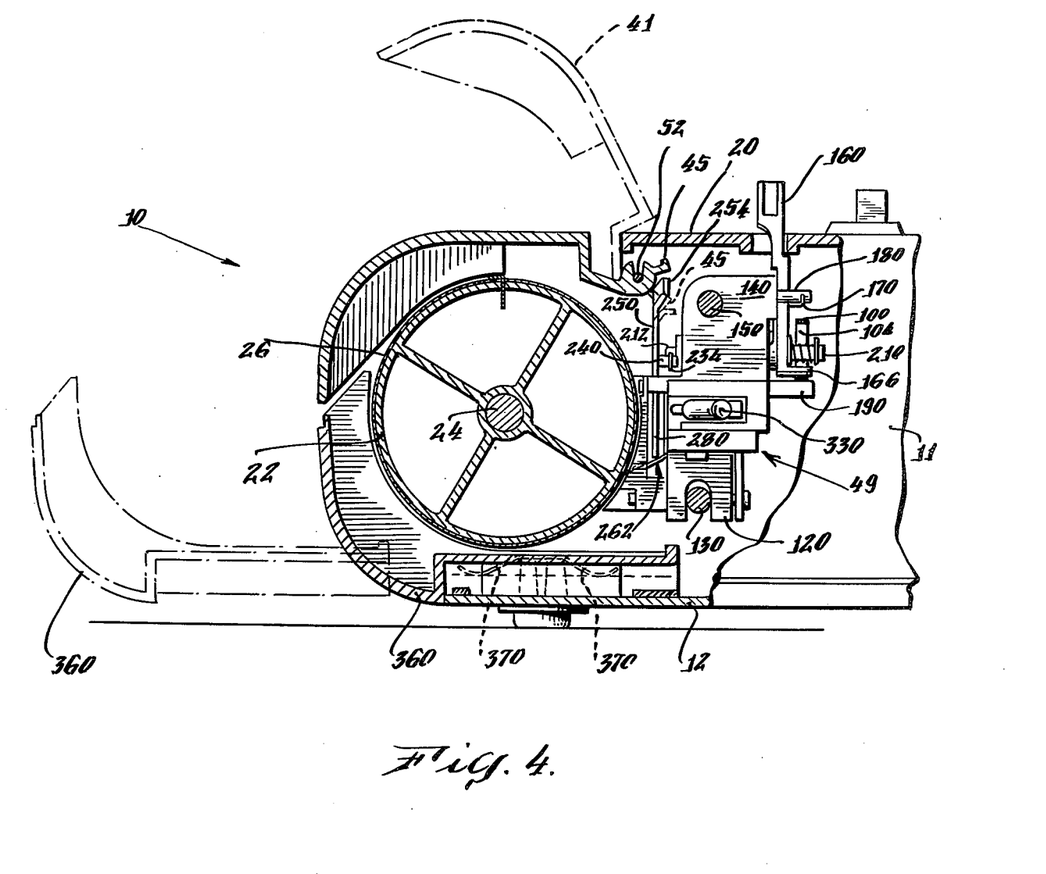
FIG. 4 is a sectional view along the lines 4—4 in FIG. 3.

The facsimile machine of the invention 10 is illustrated in FIGS. 1-3 and includes a housing or casing 11 which contains the usual electronic circuitry, a rotatable cylinder 22 which carries a document sheet 26, apparatus 49 for reading the document or writing electrically on the document sheet, a supply of toner, and a telephone handset 15 which transmits and receives electrical signals.

The housing 20 for the machine 10 includes a base plate 12 which carries various walls or other structural members which provide a support function for the machine components. At the front of the machine, the base of the machine rotatably supports the cylinder 22 which is secured to a shaft 24 and is adapted to carry a blank or printed sheet of paper 26 to be processed in a manner well known in the art.

One end of shaft 24 is coupled through a flexible coupling 28 to a motor 30, by means of which the cylinder can be rotated in operation of the apparatus. This flexible coupling arrangement serves to smooth out variations in motion of the motor and permits the shaft to be rotated smoothly.

The housing of the machine includes a cover plate or door 41 which covers the cylinder 22 and is pivotally secured to the housing by means of pins 52. At a suitable location at its rear edge, the door is provided with a projecting tab or finger 45 for a purpose to be described. The door also carries means which cooperates with a rotatable bracket coupled to the housing for use in operating band 38 to permit the removal or insertion of a sheet of paper onto the surface of cylinder 22. This mechanism is described and claimed in copending application, Ser. No. 789,073, filed 4-20-77, which is incorporated herein by reference.

The machine 10 has a read-write assembly 49 which includes a belt 100 mounted on rollers 104 for movement across the machine from one end of the cylinder 22 to the other. The rollers 104 are suitably supported on the frame at opposite ends thereof. The assembly 49 is mounted on and travels across the cylinder with the belt 100, and this assembly includes an insulating housing 110 having a generally U-shaped bracket 120 at its lower end which rides on a lower guide bar 130 and a pair of spaced-apart apertured brackets 140 at its upper end which ride on an upper guide bar 150, the upper and lower guide bars being suitably secured to the housing 110.

Figure 8:
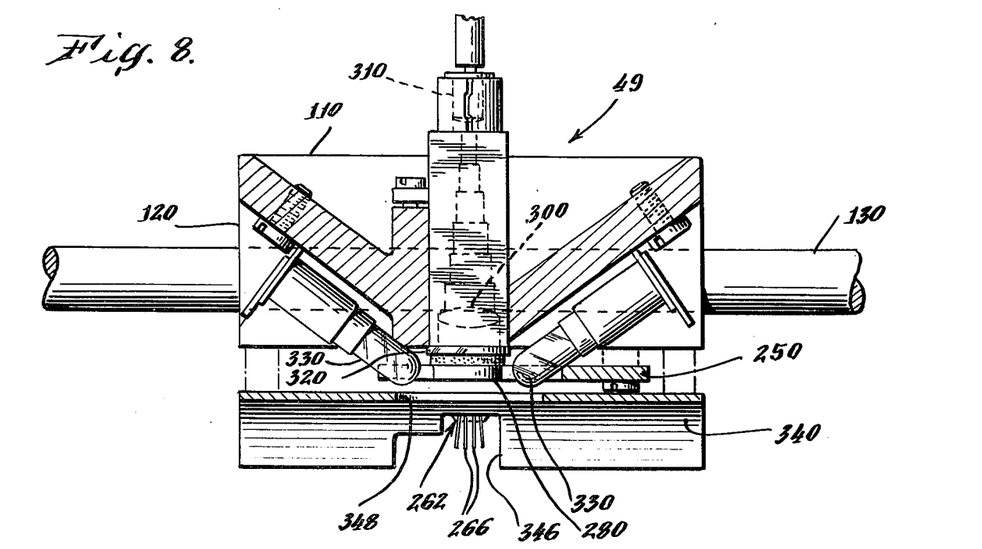
FIG. 8 is a sectional view along the lines 8—8 in FIG. 7.
Figure 9:
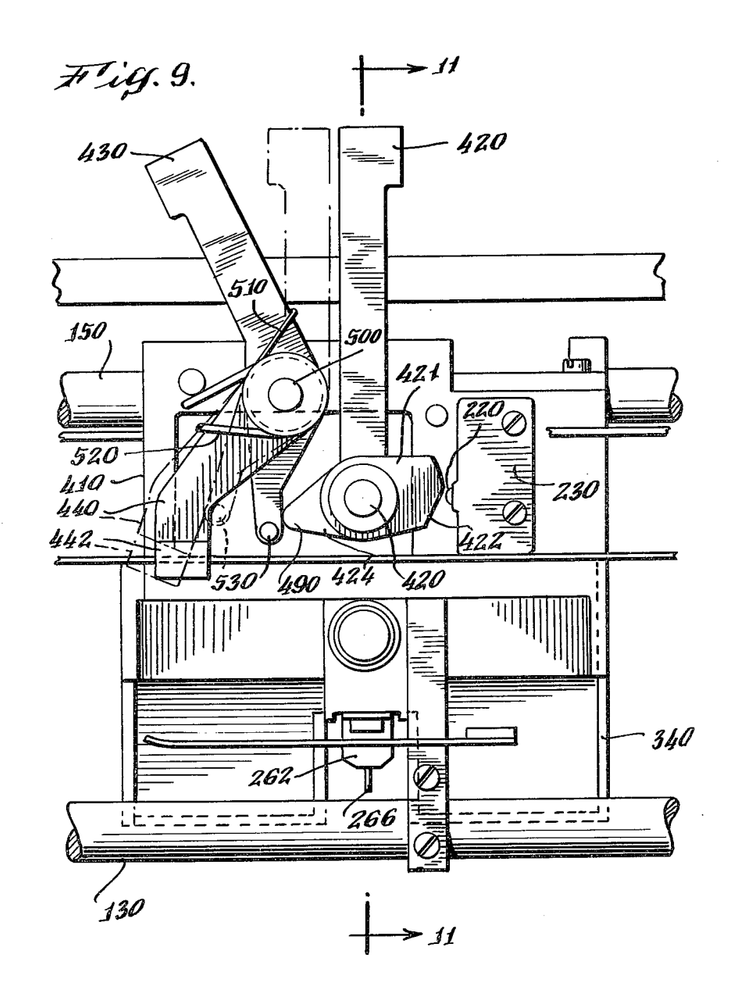
FIG. 9 is a front view of a modification of the invention.

The housing 110 carries a first belt release lever 160 which essentially comprises a metal arm pivotally secured, at about its center 164, on a portion of the housing and biased in a clockwise direction, as seen in FIG. 8, by a spring 170 wound about the center of pivot point 164 and having one end 174 which engages a pin 180 on the housing and a second end 176 which engages a portion of the housing. The lower end 166 of the lever 160 comprises a foot or plate which, in the normal position of the bracket, lies adjacent to and above a corresponding plate portion 190 of the housing 110, with the belt 100 held firmly between plate 166 and plate 190. With the belt thus clamped, the assembly 49 can move with the belt. The upper end of the lever 160 can be manipulated by the operator, by hand, to rotate the lever to secure or release the foot 166 from engagement with the belt and thereby to release the assembly 49 for manual movement on the belt or to secure the assembly to the belt for movement due to movement of the rollers driven by a motor (not shown).

A second manually operated lever 200 is provided which is generally L-shaped and includes an elongated vertical operating portion 202 and a short lateral portion 204. The lever 200 is pivotally mounted on a shaft 210 which is suitably supported in the housing. The lateral portion 204 of the lever 200 is shaped and positioned to engage a button 220 on a light switch assembly 230 secured to the housing adjacent to the arm. At its opposite end 212, the shaft 210, to which the lever 200 is secured, carries a generally horizontal pin 234 which engages a corresponding pin 240 secured to a movable arm 250. The movable arm 250 is generally curved and includes a large-area end portion 280 which is adapted to be positioned in front of a generally cylindrical chamber 290 formed in the housing beneath the arms. The arm 250 also has an upper end 254 which is positioned to be engaged by the tab 45 on the door or cover plate 41 when the door is opened, for a purpose to be described.

Figure 10:
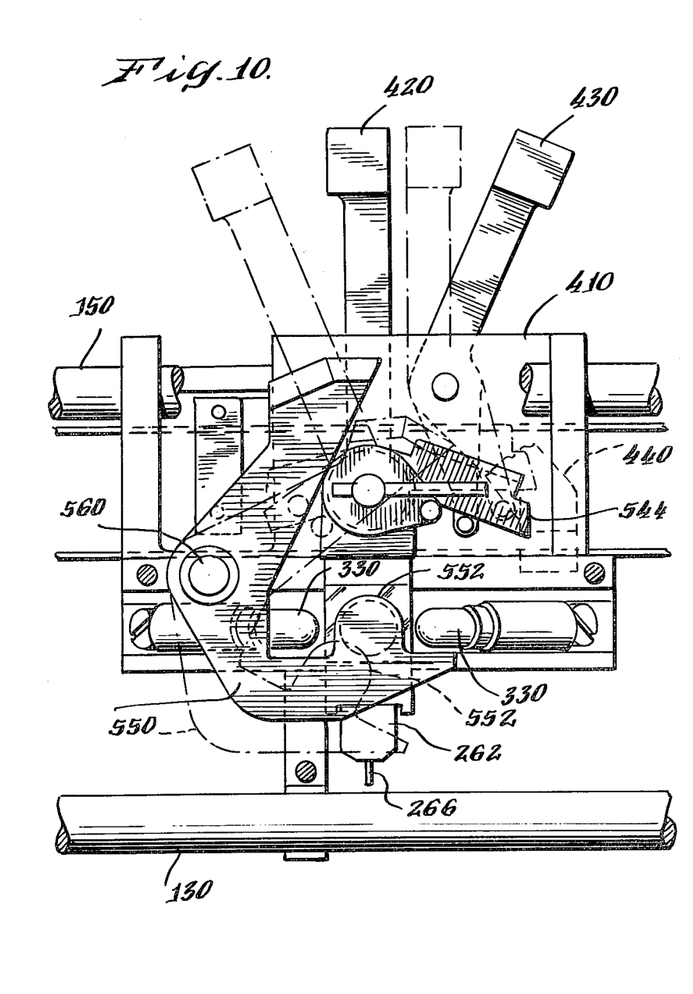
FIG. 10 is a rear view of the apparatus of FIG. 9.
Figure 11:
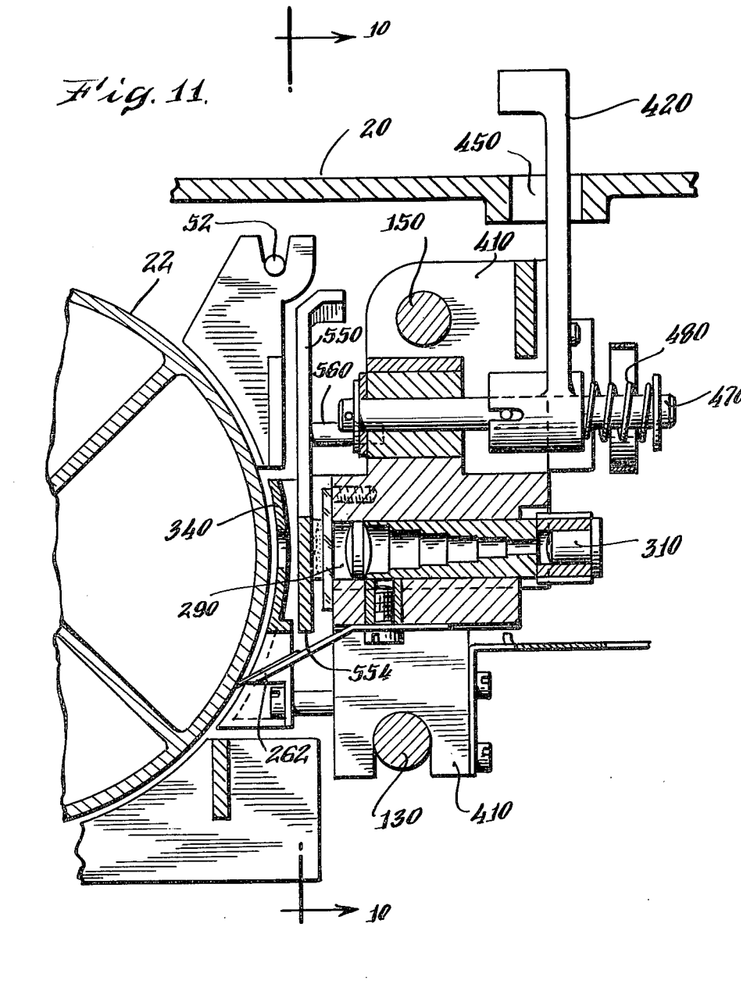
FIG. 11 is a side view of the apparatus of FIG. 9.

A stylus assembly is provided, as part of assembly 49, including a two-part plate 262 having a first portion 262A secured to the housing and a second portion 262B which extends toward the surface of the cylinder 22. The plate 262 carries one or more wire-like styli 266 which touch the cylinder 22 when the stylus assembly is in position to record on a sheet of paper 26 on cylinder 22. When the arm 250 is pivoted counter-clockwise by the door, as seen in FIG. 10, the lower edge of the arm 250 bears on the plate 262 and pushes plate 262B and the styli away from the cylinder to permit the cylinder to be rotated by hand to remove or attach a document without damaging the styli.

The chamber 290 includes a lens 300 and a photocell 310, and a filter 320 is disposed on the housing in front of the lens. A pair of light bulbs 330 are secured to the housing and aimed so that rays therefrom strike the same localized area on the paper. The insulating housing 110 carries a curved insulating plate 340 on its side which faces the cylinder 22, and it is provided with a slot 346 in its lower surface through which the plate 262B and styli 266 extend. The plate 340 is also provided with an opening 348 which is aligned with the bulbs and the chamber. When it is desired to print electrically on the paper, the movable arm 250 is in the position wherein the large-area portion 280 covers the chamber 290, and the styli 266, which are secured to the flexible plate 262 secured beneath the chamber 290, are in the normal printing position touching the sheet of paper on the cylinder 22. When it is desired to read information on the paper, lever 200 is manually operated to rotate arm 250 which moves portion 280 out of position to open the pick-up chamber 290. With the parts thus positioned, light from bulbs 330 which impinges on the sheet of paper is reflected therefrom through the lens 300 and to the photocell 310 and is utilized in a manner well known in the art. This information is processed electrically and transmitted through the telephone handset to a remote location.

The vertical front surface 112 of the housing 110 includes a pair of depressions or detents 116 and 117 in which a projection 122 on the lever 200 seats in each of its two positions. This locks the lever 200 in place in its positions.

The base plate of the machine carries the electronic circuitry of the machine, and a suitable support is provided for the usual telephone handset which is used to transmit and receive electrical signals.

In operation of the apparatus of the invention, at the beginning of an operation, the arms 160 and 200 of assembly 49 are squeezed together, and this releases arm 160 from the belt 100. The assembly 49 is then moved manually to its proper position for the beginning of a writing or reading operation. In addition, the arm 200 is moved to the proper position in which (1) either lens 300 is covered and lamps 330 are off and the stylus assembly is in contact with the paper to perform a writing operation or (2) lens 300 is unblocked, lamps 330 are on, the stylus is out of contact with the paper and the assembly can perform a reading operation.

The machine 10 includes a removable tray 360 positioned beneath the cylinder 22 for collecting debris resulting from operation of the apparatus. The tray is held in place by springs 370 and is readily removable for cleaning purposes.

A modification of the stylus assembly of the invention is shown in FIGS. 8-13 and includes many of the same parts as the assembly described above. The modified stylus assembly 400 includes an insulating housing 410 which is generally similar to housing 110 described above. Looking at the housing from the front (FIG. 8), one sees a mode (transmit or receive) lever 420, a manual shift lever 430, and an auxiliary manual shift lever 440 operated by the shift lever 430.

The rear surface of the mode lever 420 (FIG. 13) is provided with a button 450 which is adapted to enter and lock into either of two depressions or detents 460 in the housing 410 for its two operating modes. The lever 420 is mounted on a horizontal shaft 470, and it is spring-biased rearwardly by spring 480 so that it is firmly seated in one or the other of the depressions 460.

The mode lever 420 includes an enlarged lower portion 421 having a left hand projection 424 and a right hand projection 422 (FIG. 8). The enlarged portion 421 performs no function when the mode lever is in the upright or receive position. When the mode lever is in the transmit position, tilted to the right (FIG. 8), the right hand projection 422 is shaped to press button 220 of switch 230 to close switch 230 and thus to turn on the bulbs 330 (FIG. 9) which are positioned to direct light at a document whose printing is to be transmitted. The left hand portion 424 of portion 421 carries a rearwardly projecting pin 490 (FIGS. 8 and 11), for a purpose to be described.

Figure 12:
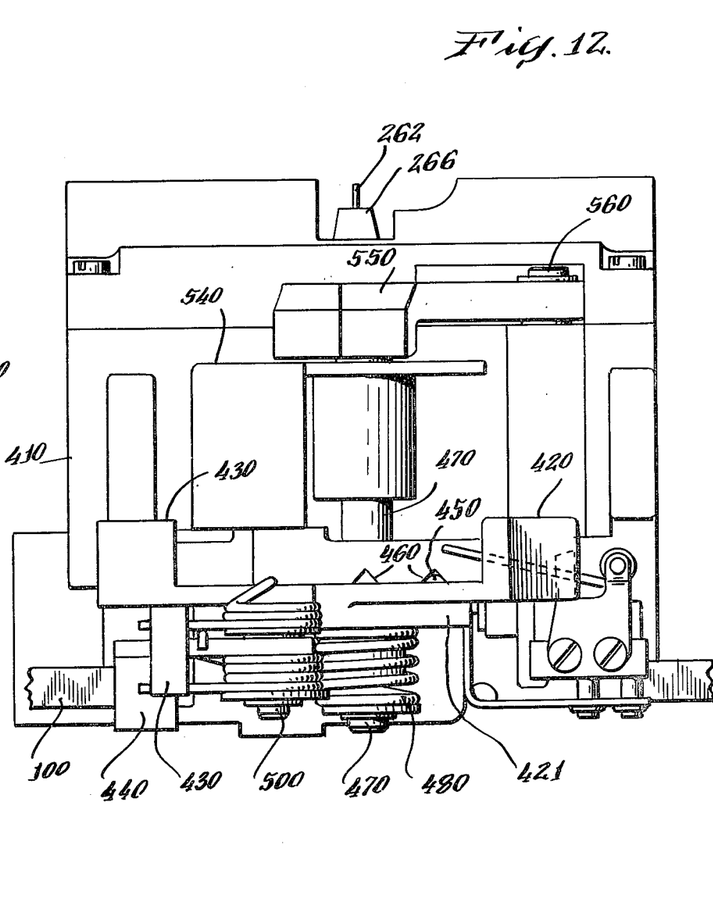
FIG. 12 is a top view of the apparatus of FIG. 9.
Figures 13, 14:
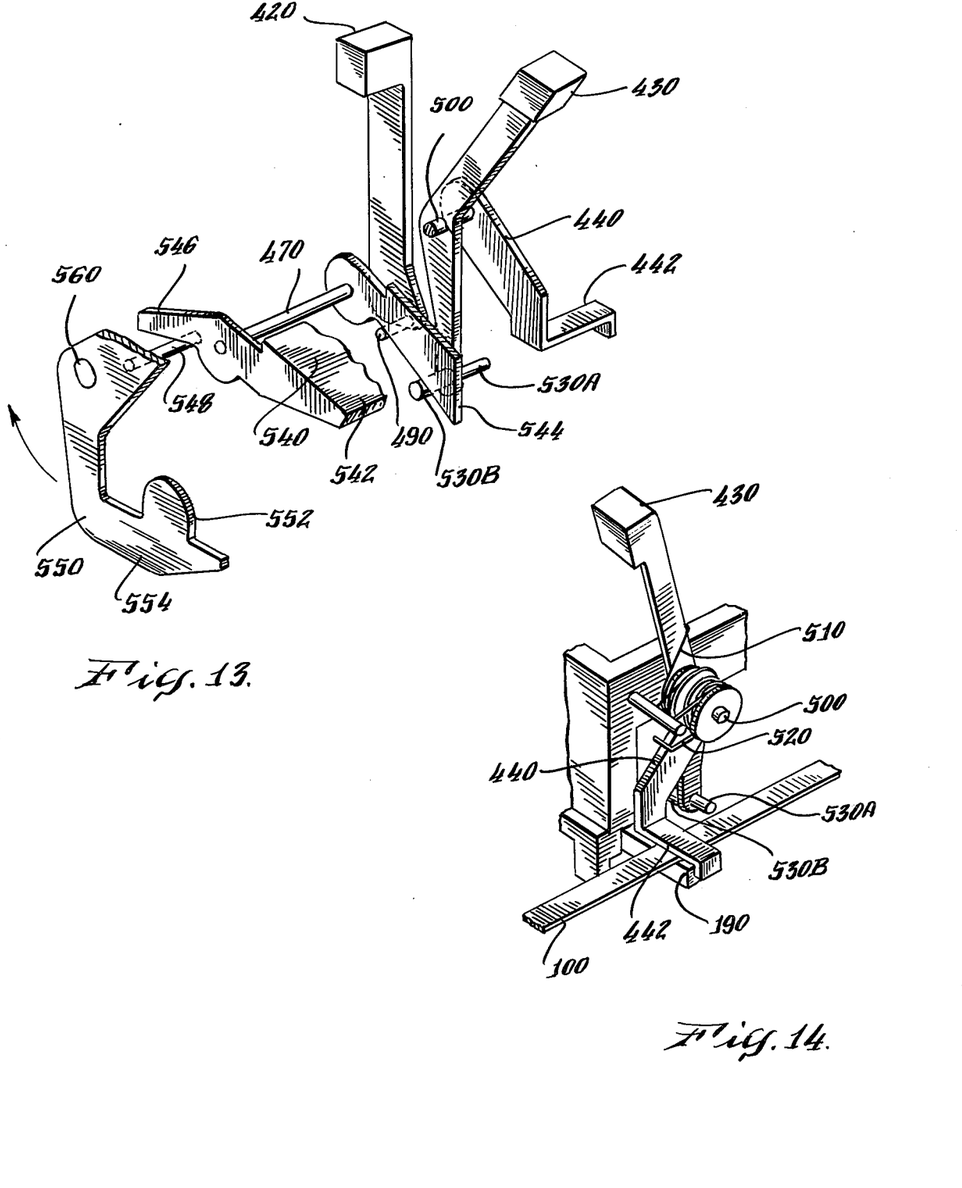
FIG. 13 is a perspective view of a portion of the apparatus of FIG. 9.
FIG. 14 is a perspective view of a portion of the apparatus of FIG. 13.
Figure 15:
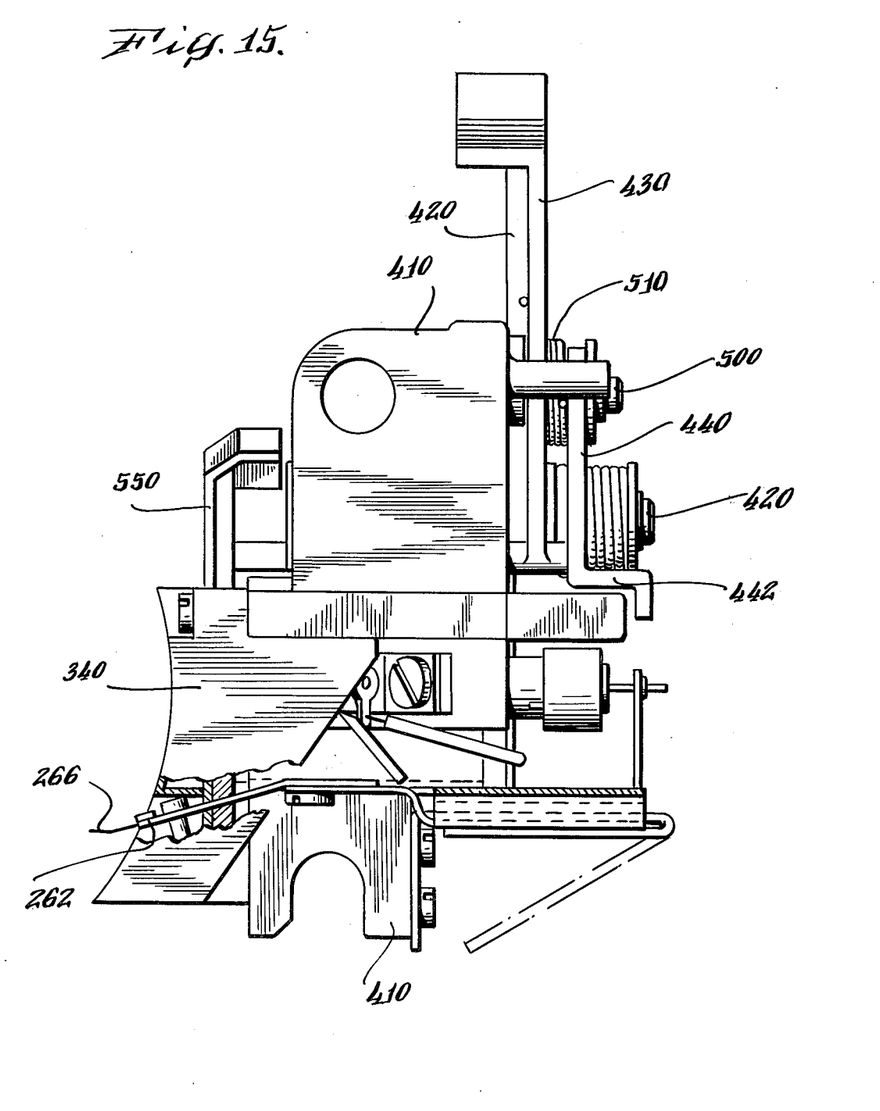
FIG. 15 is another side view of the apparatus of FIG. 9.

The manual shift lever 430 and auxiliary shift lever 440 are both pivotally mounted on a horizontal shaft 500, and they are spring-biased counter-clockwise, as seen in FIG. 8, by springs 510 and 520, respectively. The auxiliary shift lever 440 has a lower plate portion 442 which is adapted to seat on the belt 100 which lies between it and the pedestal 190 on the stylus housing (FIG. 12). The manual shift lever 430 has, at its lower end, a pin 530 having a front portion 530A positioned to engage the auxiliary shift lever 440 and a rearwardly extending portion 530B for a purpose to be described.

Figure 5:
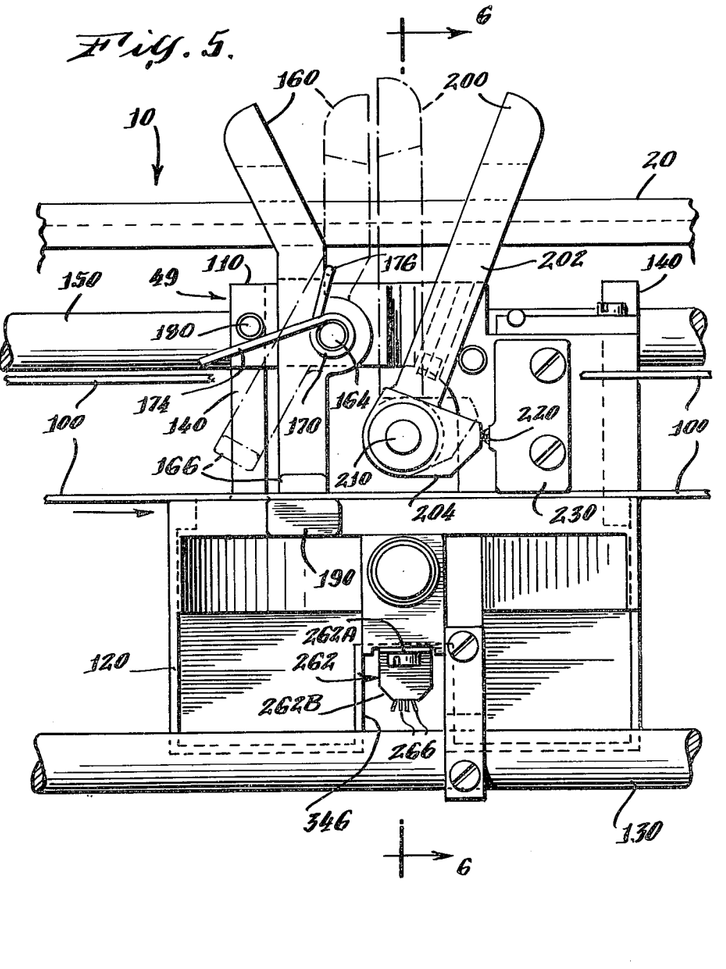
FIG. 5 is a front elevational view of the read-write apparatus used in the machine of FIG. 1.
Figure 6:
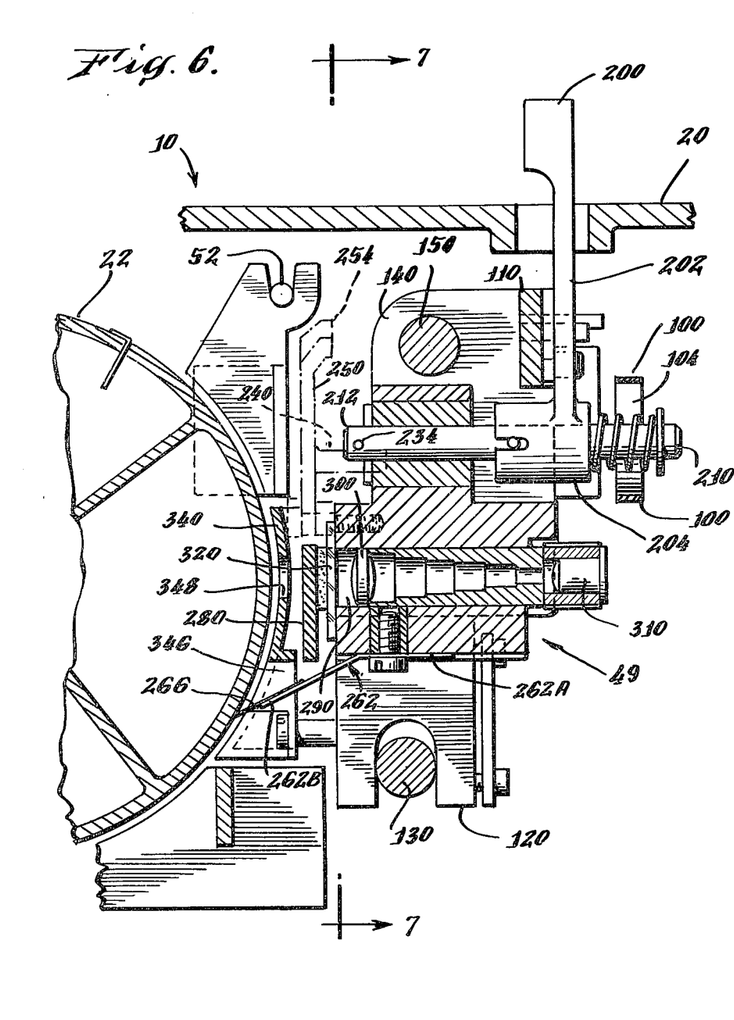
FIG. 6 is a sectional view along the lines 6—6 in FIG. 5.
Figure 7:
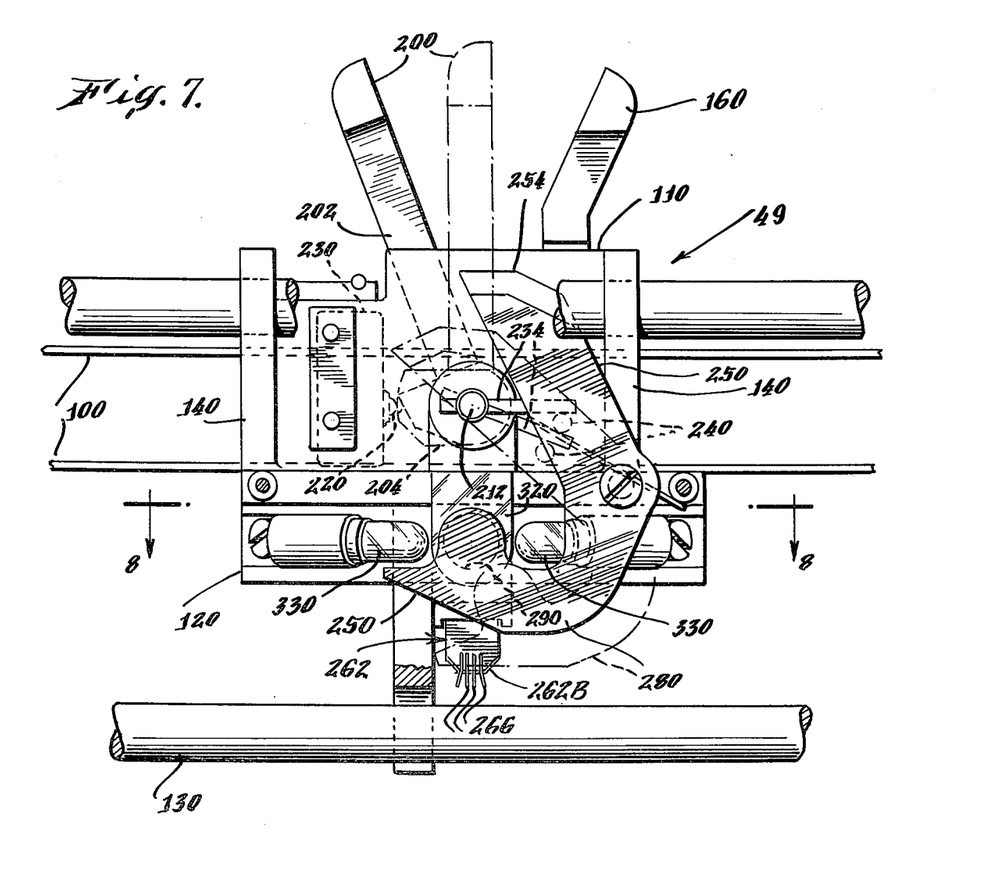
FIG. 7 is a rear elevational view of the apparatus of FIG. 5.

Rearwardly of the mode lever 420 is provided an auxiliary lever 540 which is not secured to shaft 470 but is rotatably mounted thereon. The lever 540 comprises a large-area horizontal plate 542 having a vertical depending front wall 544 which is positioned above and operates with the pins 490 and 530B on the mode lever and shift lever, respectively. The lever 540 has at its rear, an arm 546 which projects laterally and rests on a post 548 which extends forwardly from the rear surface of the shutter plate 550 which is pivotally mounted on the housing on shaft 560. The shutter plate 550 is essentially the same as that described above and has a portion 552 which can block the light tunnel or chamber 290, and it is shaped so that the lower edge 554 can contact and move the stylus assembly 262 out of position when the plate 550 rotates clock-wise, as seen in FIG. 5. The shutter plate is spring-biased counter-clockwise, as seen in FIG. 5.

In operation of the invention, when it is desired to operate in the receive mode, in which a message is electrostatically printed by stylus 266 on a sheet of paper on drum 22, the mode lever 420 and shift lever 430 are squeezed together to set the mode lever in the correct vertical orientation. This action also frees the assembly from the belt 100 and permits it to be moved to its starting position. When lever 430 is rotated clockwise (FIG. 8), the pin 530 engages arm 544 of plate 540 and rotates the shutter plate 500 to push the stylus assembly 262 away from the paper. Continued rotation of the lever 430 causes pin 530A to bear against the auxiliary arm 440 and to push it and its plate 442 out of contact with the belt 100 so that the entire head can be moved to the desired starting position. Relaxation of pressure on the lever 430 permits its springs to move it clockwise so that the lower plate 442 grips the belt, and the shutter plate 550 moves counter-clockwise to block the lens tunnel 290 and to release the stylus which moves into printing position on the paper, and the apparatus is ready to print.

To perform a transmission operation, the mode lever 420 is rotated clockwise, as seen in FIG. 8, so that its lower portion 421 can close switch 230 and turn on bulbs 330. When lever 420 is rotated clockwise, its post 530 (FIG. 11) pivots plate 540 counter-clockwise and rotates the shutter plate 550 clockwise to push the stylus away from the paper and to unblock the lens tunnel 290. Now light from bulbs 330 can strike the document and be reflected into the lens tunnel and to the electronic transmission circuitry.

What is claimed is:

1. A facsimile machine comprising
   a housing,
   a cylinder, in said housing adapted to carry a sheet of paper on which a message is to be written or which carries a message to be read, and
   a read-write assembly disposed adjacent to said cylinder and the sheet of paper carried thereby,
   said assembly including two manually operable levers, one for positioning said assembly with respect to said cylinder and one for setting said assembly in its read or write operating mode.

2. The machine defined in claim 1 and including a belt mounted on said housing to reciprocate back and forth, said assembly being secured to said belt whereby it is carried back and forth along said cylinder.

3. A facsimile machine comprising
   a housing,
   a cylinder, in said housing adapted to carry a sheet of paper on which a message is to be written or which carries a message to be read,
   a drive belt, and
   a read-write assembly disposed adjacent to said cylinder and the sheet of paper carried thereby,
   said assembly comprising
   an insulating block,
   a light chamber in said block aligned with a portion of said cylinder,
   a first lever pivotally mounted on said block and including a portion adapted to engage said belt, and
   a second lever pivotally mounted on said block and including a portion positioned to operate a light switch, and a second portion adapted to operate means for blocking and unblocking said light chamber in said block.

4. A facsimile machine comprising
   a housing,
   a cylinder, in said housing adapted to carry a sheet of paper on which a message is to be written or which carries a message to be read,
   a drive belt, and
   a read-write assembly disposed adjacent to said cylinder and the sheet of paper carried thereby,
   said assembly comprising
   an insulating block,
   a light chamber in said block aligned with a portion of said cylinder,
   a plate pivotally mounted on said block and adapted to block or unblock said light chamber,
   a first lever pivotally mounted on said block and including a portion adapted to engage said belt, and
   a second lever pivotally mounted in said block and including a portion positioned to operate a light switch, and a second portion adapted to operate said plate for blocking and unblocking said light chamber in said block, depending on whether a read or write operation is to be performed.

5. A stylus assembly for a facsimile machine comprising
   a rotatable shutter having a portion for blocking a light-receiving chamber in one position of said shutter, said shutter having a front surface and a rear surface,
   a pin projecting from said rear surface of said shutter,
   a rotatable bracket having, at its rear, a laterally projecting arm seated on said pin, and, at its front, a vertical wall,
   a two-position rotatable lever carrying a projecting post which engages said vertical wall of said rotatable bracket for rotating said bracket and thus said shutter to open or obstruct said light-receiving chamber, when in one or the other of its two positions,
   a second rotatable lever and a third rotatable lever mounted for rotation on a common shaft, said second lever carrying a post which engages said vertical wall of said bracket and which also can engage said third lever at a maximum rotation of said second lever, said third lever engaging a belt for transporting said assembly along a path of travel.

6. A facsimile machine comprising
   a housing,
   a cylinder, in said housing adapted to carry a sheet of paper on which a message is to be written or which carries a message to be read,
   a drive belt, and
   a read-write assembly disposed adjacent to said cylinder and the sheet of paper carried thereby and movable with said belt,
   said assembly including two manually operable levers, one for positioning said assembly with respect to said cylinder and one for setting said assembly in its read or write operating mode.

7. A facsimile machine comprising
   a housing,
   a cylinder, in said housing adapted to carry a sheet of paper on which a message is to be written or which carries a message to be read,
   an endless belt, and
   a read-write assembly disposed adjacent to said cylinder and the sheet of paper carried thereby,
   said assembly including two manually operable levers rotatably mounted thereon, one lever being rotatable to grip and release said belt to permit moving and positioning said assembly with respect to said cylinder, the other lever being rotatable for setting said assembly in its read or write operating mode.

8. A facsimile machine comprising
   a housing, a cylinder, in said housing adapted to carry a sheet of paper on which a message is to be written or which carries a message to be read, an endless belt, and a read-write assembly disposed adjacent to said cylinder and the sheet of paper carried thereby, said assembly including a stylus assembly for applying electrical charges to said sheet of paper when a message is being received, and a source of light for scanning a message carried by said sheet of paper when the message is being transmitted, said assembly also including two manually operable levers rotatably mounted thereon, one lever being rotatable to grip and release said belt to permit moving and positioning said assembly with respect to said cylinder, the other lever being rotatable for setting said assembly in its read or write operating mode, said other lever also moving said stylus out of contact with said sheet of paper when said assembly is moved manually with respect thereto, said other lever also operating to expose or block said light source.

9. A facsimile machine comprising a housing, a cylinder, in said housing adapted to carry a sheet of paper on which a message is to be written or which carries a message to be read, an endless belt, and a read-write assembly disposed adjacent to said cylinder and the sheet of paper carried thereby, said assembly including (1) a stylus assembly for applying electrical charges to said sheet of paper when a message is being received, (2) a source of light for scanning a message carried by said sheet of paper when the message is being transmitted, and (3) a rotatably mounted shutter plate for exposing or blocking said source of light, said shutter plate also being operable to push said stylus assembly out of contact with said paper at the same time that it exposes said source of light to said paper, said assembly also including two manually operable levers rotatably mounted thereon, one lever being rotatable to grip and release said belt to permit moving and positioning said assembly with respect to said cylinder, the other lever being rotatable for setting said assembly in its read or write operating mode, said other lever also moving said stylus out of contact with said sheet of paper when said assembly is moved manually with respect thereto, said other lever also operating said shutter plate to expose or block said light source.

10. The machine defined in claim 9 and including an auxiliary rotatable bracket coupled between one of said levers and said rotatable shutter plate.

* * * * *